United States Patent
Chen et al.

(10) Patent No.: US 8,564,259 B2
(45) Date of Patent: Oct. 22, 2013

(54) CLOCK PHASE SHIFTER FOR USE WITH BUCK-BOOST CONVERTER

(75) Inventors: Sicheng Chen, Plano, TX (US);
Congzhong Huang, Plano, TX (US);
Xuelin Wu, Plano, TX (US)

(73) Assignee: Intersil Americas LLC, Milpitas, CA (US)

( * ) Notice: Subject to any disclaimer, the term of this patent is extended or adjusted under 35 U.S.C. 154(b) by 400 days.

(21) Appl. No.: 13/047,424

(22) Filed: Mar. 14, 2011

(65) Prior Publication Data

US 2012/0105038 A1    May 3, 2012

Related U.S. Application Data

(60) Provisional application No. 61/409,176, filed on Nov. 2, 2010.

(51) Int. Cl.
*G05F 1/618* (2006.01)
*G05F 1/62* (2006.01)

(52) U.S. Cl.
USPC .................................. 323/259; 323/283

(58) Field of Classification Search
USPC .......... 323/225, 259, 282, 283, 284, 285, 344
See application file for complete search history.

(56) References Cited

U.S. PATENT DOCUMENTS

| | | | | |
|---|---|---|---|---|
| 4,095,165 A | * | 6/1978 | Boros | 323/283 |
| 7,843,177 B2 | * | 11/2010 | Ho et al. | 323/222 |
| 7,944,191 B2 | * | 5/2011 | Xu | 323/259 |
| 8,018,212 B1 | * | 9/2011 | Petricek | 323/259 |
| 8,436,592 B2 | * | 5/2013 | Saitoh | 323/259 |
| 2005/0280402 A1 | * | 12/2005 | Nitta et al. | 323/259 |
| 2006/0284606 A1 | * | 12/2006 | Chen et al. | 323/259 |
| 2007/0273340 A1 | * | 11/2007 | Miller et al. | 323/224 |

* cited by examiner

*Primary Examiner* — Gary L Laxton
(74) *Attorney, Agent, or Firm* — Paul B. Bernkopf; Graybeal Jackson LLP; Bryan A. Santarelli

(57) ABSTRACT

A buck boost converter generates a regulated output voltage responsive to an input voltage and switching control signals. Switching control circuitry generates the switching control signals responsive to the regulated output voltage, a maximum duty cycle signal and a mode signal. Mode control circuitry generates the maximum duty cycle signal and the mode signal responsive to a buck PWM signal and a boost PWM signal, a first clock signal and a second clock signal phase shifted from the first clock signal by a fixed, programmable amount. A phase shifter generates the first clock signal and the second clock signal responsive to a reference voltage and a synchronization signal.

21 Claims, 3 Drawing Sheets

CLOCK PHASE SHIFTER FOR USE WITH BUCK-BOOST CONVERTER

CROSS-REFERENCE TO RELATED APPLICATIONS

This application claims priority to U.S. Provisional Application No. 61/409,176, entitled CLOCK PHASE SHIFTER FOR USE WITH BUCK-BOOST CONVERTER, filed on Nov. 2, 2010, which is incorporated herein by reference in its entirety.

BRIEF DESCRIPTION OF THE DRAWINGS

For a more complete understanding, reference is now made to the following description taken in conjunction with the accompanying Drawings in which.

DETAILED DESCRIPTION

Figure 1:
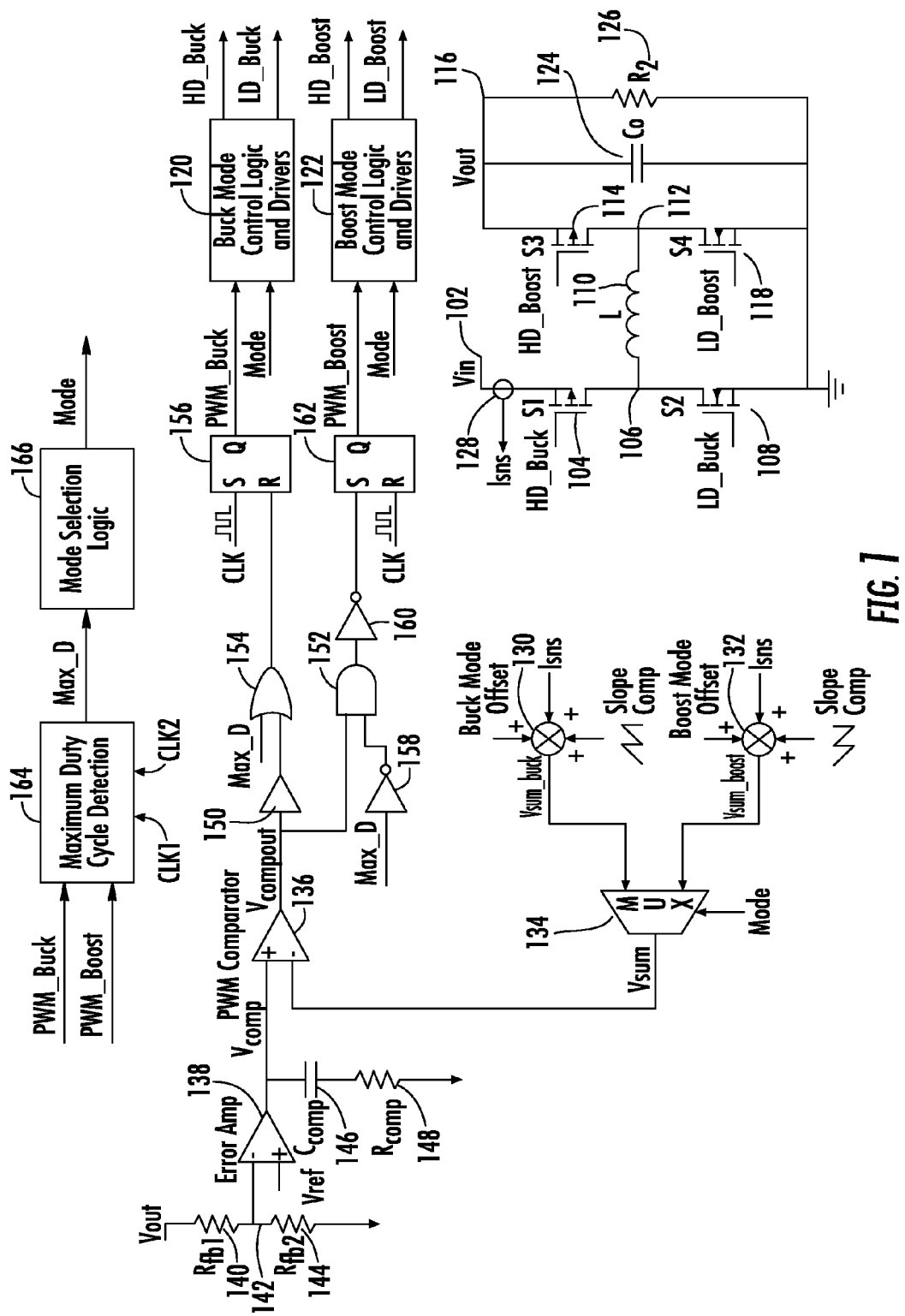
FIG. 1 is a block diagram of a non-inverting buck-boost converter.

Referring now to the drawings, wherein like reference numbers are used herein to designate like elements throughout, the various views and embodiments of a clock phase shifter for use with buck-boost converter are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

A buck-boost converter is used for generating a regulated output voltage responsive to an input voltage. The input voltage may be higher or lower than the regulated output voltage. When in the buck mode of operation, the regulated output voltage is lower than the input voltage. When in the boost mode of operation, the regulated output voltage is higher than the input voltage. The mode of operation of the buck-boost converter is controlled by the duty cycle control. If the duty cycle of a switching node of the buck-boost converter is higher than a selected value (e.g., 90%), the duty cycle control will switch operation of the buck-boost converter from the buck mode of operation to the boost mode of operation or from the boost mode of operation to the buck mode of operation. By implementing a control scheme for generating a clock signal with an adjustable phase shift, the operation of the duty cycle switching within the buck-boost converter may be better controlled.

Referring now to the drawings, and more particularly to FIG. 1, there is illustrated a schematic block diagram of a non-inverting buck-boost converter. The non-inverting buck-boost converter uses a peak current control method in the buck mode of operation and a valley current control method in the boost mode of operation. An input voltage $V_{IN}$ is applied at the input voltage node 102. A P-channel switching transistor 104 has its source/drain path connected between node 102 and node 106. An N-channel switching transistor 108 has its drain/source path connected between node 106 and ground. An inductor 110 is connected between node 106 and node 112. An N-channel transistor 114 has its source/drain path connected between node 116 and node 112. Node 116 comprises the output voltage node from which the regulated output voltage $V_{OUT}$ is provided. A P-channel switching transistor 118 is connected between node 112 and ground.

In the buck mode of operation the gates of switching transistors 114 and 118 are connected to ground while the switching transistors 104 and 108 are alternately turned on and off responsive to the HD_BUCK and LD_BUCK control signals received from the buck mode control logic and drivers 120. Similarly, when the buck-boost converter is in the boost mode of operation, the gates of switching transistors 104 and 108 are connected to ground while switching transistors 114 and 112 are alternatively switched responsive to the control signals HD_BOOST and LD_BOOST received from the boost mode control logic and driver 122. A capacitor 124 is connected between node 116 and ground. A resistor 126 is in parallel with capacitor 124 between node 116 and ground.

A current sensor 128 monitors the input current at the input voltage node 102 and generates a voltage signal ISNS responsive thereto. The ISNS signal is applied to mixing circuits 130 and 132, respectively. Mixing circuit 130 adds the detected current sense signal ISNS with a slope compensation signal and a buck mode offset signal. Mixing circuit 132 adds the ISNS signal with the slope compensation signal and the boost mode offset signal. The output of the mixing circuit 130 comprises the $V_{SUM\_BUCK}$ signal while the output of the mixing circuit 132 comprises the $V_{SUM\_BOOST}$ signal. The $V_{SUM\_BUCK}$ and $V_{SUM\_BOOST}$ signals are provided as inputs to a multiplexer 134. The multiplexer 134 selects one of the $V_{SUM\_BUCK}$ and $V_{SUM\_BOOST}$ signals based upon a mode control signal mode provided from mode selection logic 166 which will be more fully described herein below. The mode signal provides the indication of whether the buck-boost converter is in the buck mode of operation or boost mode of operation. The mode control signal selects the $V_{SUM\_BUCK}$ signal when the converter is in the buck mode of operation and the $V_{SUM\_BOOST}$ signal when the converter is in the boost mode of operation.

As previously stated, the output of the multiplexer $V_{SUM}$ is the sum of the input current ISNS, the buck or boost mode offset and a slope compensation signal. The different values of offsets in the buck and boost modes of operation are selected based upon the maximum slope compensation in a full cycle. Usually the different value of the offsets is twice the maximum slope compensation voltage. For example, if the slope compensation is 1V/us and the switching frequency is 1 MHz, the different value of the offsets are 1V/us*1 us*2, which is 2V. So if the offset in buck mode is Vos, then the offset for the boost mode is Vos+2V. A system operating in this manner provides line transients that are superior in both light loading and heavy loading conditions. The voltage ripple is also small when the output voltage is close to the input voltage. The control method is simple requiring only a single integrated current sensor and cycle-by-cycle detection.

The output of the multiplexer 134 is provided to an inverting input of PWM comparator 136. The non-inverting input of the PWM comparator 136 is connected to receive the error voltage signal $V_{COMP}$. The error voltage signal $V_{COMP}$ is provided from an error amplifier 138. The non-inverting input of error amplifier 138 is connected to a reference voltage $V_{REF}$. The inverting input of error amplifier 138 is connected to a voltage divider circuit comprised of a resistor 140 connected between the output voltage node 116 and node 142 and a resistor 144 connected between node 142 and ground. A compensation circuit consisting of a capacitor 146 connected in series with a resistor 148 is connected between the output of the error amplifier 138 and ground.

The PWM comparator 136 generates a PWM control signal $V_{COMP\_OUT}$ responsive to the error voltage $V_{COMP}$ and the $V_{SUM}$ signal from the multiplexer 134. The $V_{COMP\_OUT}$ signal from the PWM comparator 136 is provided to an input of an inverter 150 and to one input of an AND gate 152. The output of inverter 150 is provided to a first input of an OR gate 154. The other input of OR gate 154 is connected to receive the MAX_D control signal. The output of OR gate 154 is connected to the R input of an SR latch 156. The S input of the SR latch 156 receives a clock signal CLK1. The output of the SR latch 156 provides the PWM_BUCK signal which is provided to the buck mode control logic and drivers 120. The buck mode control logic and drivers 120 also receives the MODE signal from the mode selection logic 166. The buck mode control logic and drivers 120 generate the HD_BUCK control signal provided to the gate of switching transistor 104 and the LD_BUCK control signal provided to the gate of switching transistor 108.

The AND gate 152 in addition to receiving the output of the PWM comparator 136 receives an inverted MAX_D signal from an inverter 158. The input of inverter 158 is connected to receive the MAX_D signal and the inverter's output is provided to one of the inputs of AND gate 152. The output of AND gate 152 is connected to an inverter 160 which inverts the output of AND gate 152 prior to providing the signal to the S input of SR latch 162. The R input of the SR latch 162 receives the clock signal CLK1. The output of the SR latch 162 comprises a PWM_BOOST signal which is provided as an input to the boost mode control logic and driver 122. The boost mode control logic and driver 122 also receive the MODE signal from the mode selection logic 166. The boost mode control logic and driver 122 generate the HD_BOOST signal provided to the gate of switching transistor 114 to control the operation thereof, and the LD_BOOST control signal to the gate of switching transistor 118 to control the operation of transistor 118.

The PWM_BUCK control signal from SR latch 156 and the PWM_BOOST signal from SR latch 162 are also provided as inputs to the maximum duty cycle detection circuit 164. The maximum duty cycle detection circuit 164 also receives the CLK1 and CLK2 clock signals having a fixed phase difference from each other as will be more fully described with respect to FIG. 2. Responsive to these signals, the maximum duty cycle detection circuit 164 generates the MAX_D control signal. The MAX_D control signal indicates a maximum duty cycle condition within the buck-boost converter circuit. The MAX_D control signal is provided as a control input to the input of inverter 158 and to the input of OR gate 154 as described previously. The maximum duty cycle condition occurs when Vcompout triggers later than CLK2. The MAX_D control signal is also input to the mode selection logic 156 which determines the mode of operation, buck or boost, of the buck-boost converter and generates the MODE control signal that is provided to the input of multiplexer 134 and to each of the buck mode control logic and drivers 120 and boost mode control logic and drivers 122. The MODE signal provides an indication of whether the buck-boost converter is to operate in the buck mode of operation or the boost mode of operation.

Figure 2:
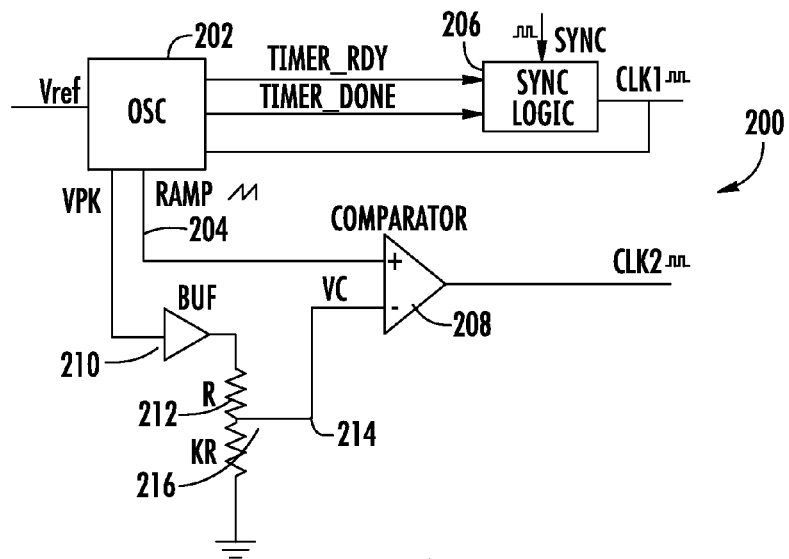
FIG. 2 is a block diagram of an adjustable clock phase shifter circuit for use with a buck-boost converter.

Referring now to FIG. 2, there is illustrated a schematic block diagram of the programmable clock phase shifter for use with the buck-boost converter of FIG. 1. The programmable clock phase shifter generates a pair of clock signals CLK1 and CLK2 wherein the CLK2 signal is phase shifted from the CLK1 signal by a predetermined amount. The CLK1 and CLK2 clock signals are used to generate the MAX_D control signal that is generated by the maximum duty cycle detection circuit 164 of FIG. 1. The programmable clock phase shifter 200 includes an oscillator 202 that generates a RAMP signal at a default frequency responsive to a reference voltage $V_{REF}$ applied thereto. The oscillator 202 generates a number of signals responsive to the reference voltage $V_{REF}$. These include the VPK signal, the RAMP signal, the TIMER_RDY signal and the TIMER_DONE signal. The oscillator 202 is also responsive to the CLK1 signal generated from sync logic 206. The VPK signal comprises the peak value of the ramp signal RAMP that is generated on the ramp output line 204. The TIMER_RDY signal provides an indication of when the RAMP signal generated on the ramp output line 204 is pulled down to ground and the programmable phase shifter circuit is ready for a next cycle. The TIMER_DONE signal is triggered when the RAMP signal reaches the reference voltage $V_{REF}$.

The TIMER_RDY and TIMER_DONE signals are each provided to the sync logic circuit 206 along with the SYNC signal. The SYNC signal is provided from an external pin and determines the buck-boost converter's switching frequency. The sync logic 206 generates the CLK1 signal which is provided as an output to the maximum duty cycle circuit 164 and is also provided as a signal to the oscillator 202.

The RAMP signal provided on line 204 from the oscillator circuit 202 is provided to the non-inverting input of a comparator 208. A second signal VC is provided to the inverting input of the comparator 208. The signal VC comprises a scaled version of the signal VPK detected at the oscillator 202. The VPK signal, indicating the peak voltage of the RAMP signal, is provided to a buffer circuit 210. The output of the buffer circuit 210 is provided to a voltage divider circuit consisting of a resistor 212 between the output of the buffer 210 and node 214 and a resistor 216 between node 214 and ground. The resistor 212 has a size R while the resistor 216 is a variable resistor having a value of KR. The output of the comparator 208 comprises the CLK2 clock signal which is offset from the CLK1 signal by a value that is programmable responsive to the selected value of the resistor 216. The comparator 208 generates a logic LOW to logic HIGH transition at its output when the RAMP signal substantially equals the voltage VC.

Figure 3:
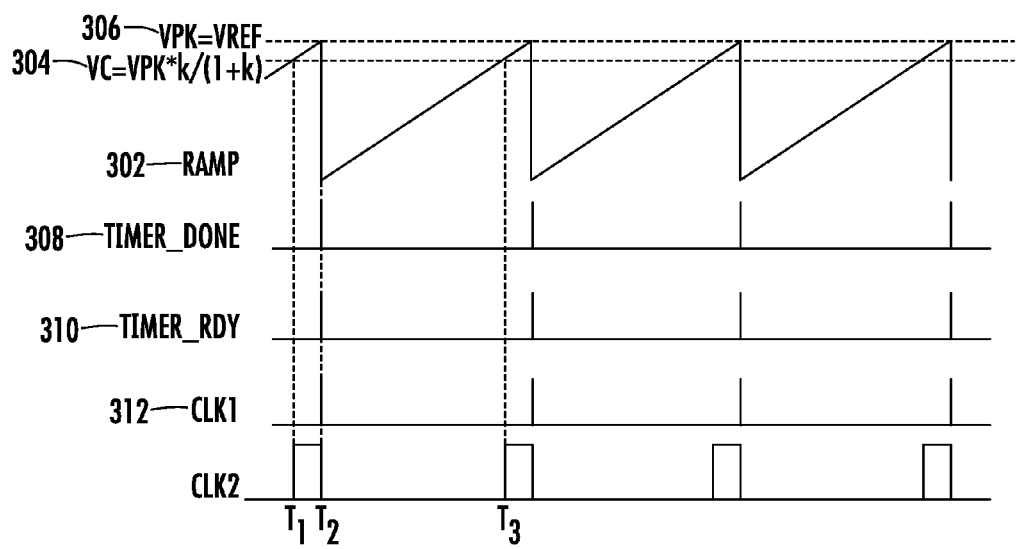
FIG. 3 is a timing diagram illustrating the operation of the adjustable clock phase shifter when no sync clock is present or the sync frequency is lower than a default frequency.

Referring now to FIG. 3, there is illustrated the operation of the programmable clock phase shifter when no synchronization clock signal (SYNC signal) is provided to the sync logic 206. The waveforms illustrated in FIG. 3 demonstrate the operation of the programmable clock phase shifter when there is no sync clock signal provided to the sync logic 206 or when the SYNC signal frequency is lower than the frequency of the oscillator 202. The RAMP signal 302 comprises the ramp voltage signal that is generated by the oscillator 202. The VC signal 304 comprises the voltage level that is provided to the inverting input of the comparator 208 which is the scaled version of the VPK signal 306 provided from the oscillator 202. The VPK signal 306 comprises the peak voltage level of the RAMP signal 302 that is provided by the oscillator 202. The TIMER_DONE signal 308 provides a pulse when the RAMP signal 302 reaches the VPK level. The TIMER_RDY signal 310 provides a pulse when the RAMP signal is reset to ground.

When the ramp signal 302 reaches the VC signal 304 voltage level at time $T_1$, the output of the comparator 208 goes high and initiates a clock pulse for the CLK2 signal. The RAMP signal 302 continues increasing until it reaches the VPK ($V_{REF}$) voltage level at time $T_2$. When the RAMP signal 302 reaches the VPK ($V_{REF}$) level, the TIME DONE pulse is generated from the oscillator 202. This causes the RAMP signal 302 to be pulled low to ground. Responsive to the RAMP signal being pulled down to ground, the TIMER_RDY pulse 310 is generated at time $T_2$ indicating that the oscillator 202 is ready for the next clock cycle. Substantially at time $T_2$ the clock pulse of CLK2 is terminated. Responsive to the TIMER_DONE pulse 308 and the TIMER_RDY signal 310 pulse, the sync logic 206 generates the CLK1 signal 312 pulse at time $T_2$. The RAMP signal then begins increasing from time $T_2$ to time $T_3$, wherein the above process then repeats.

The TIMER_RDY signal causes the generation of a CLK1 pulse at the output of the sync logic 202. A sample and hold circuit within the oscillator circuit 202 saves the peak value of the RAMP signal 302 as the signal VPK which is equal to $V_{REF}$ in the circuit o FIG. 3. The VPK signal is divided down using a resistor divider consisting of resistor 212 and resistor 216 in order to generate the divided down signal VC. The divided down signal VC is used as a reference voltage to create the CLK2 signal at the output of the comparator 208 responsive to a comparison with RAMP signal 302. The CLK2 signal will cause the MAX_D signal at the maximum duty cycle detection circuit 164 to be set to approximately 90% (or any other desired value). By adjusting the K value of resistor 216, the maximum duty cycle can be adjusted via adjusting the position of the MAX_D signal. In an integrated circuit, resistor matching can be achieved within 1%, therefore the accuracy of MAX_D and the phase difference between the CLK2 and CLK1 signals of the programmable phase adjuster circuit is high.

Figure 4:
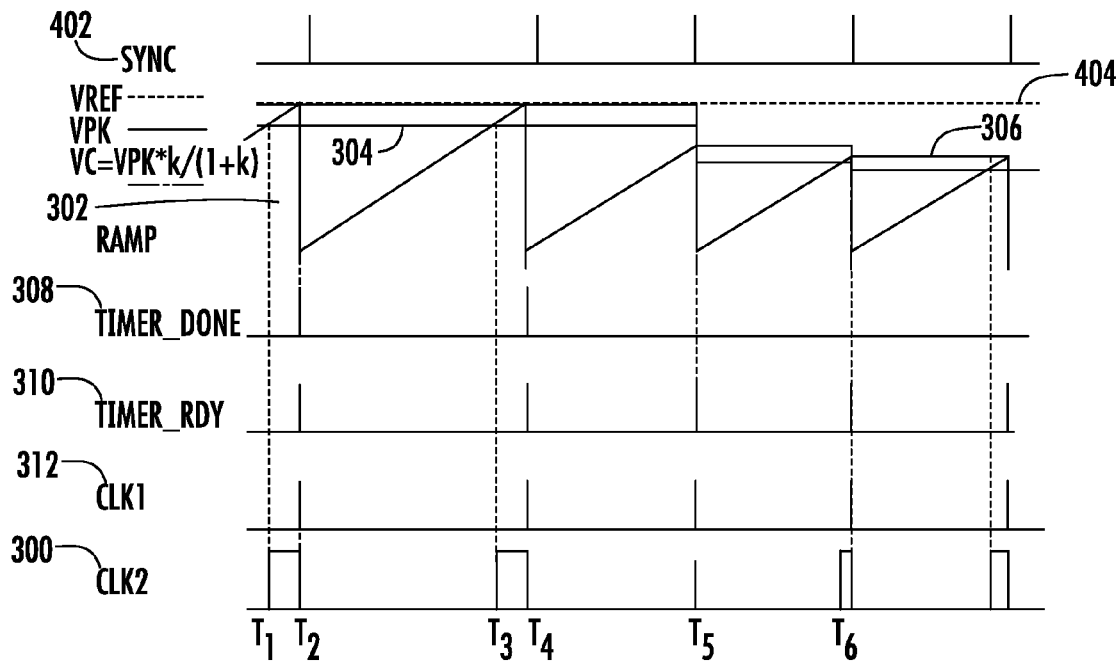
FIG. 4 is a timing diagram illustrating the operation of the clock phase shifter circuit when the sync clock frequency is higher than the default frequency.

Referring now to FIG. 4, there is illustrated the operation of the programmable clock phase shifter circuit when the sync clock frequency of the SYNC signal 402 applied to the sync logic 206 is higher than the default frequency of the oscillator within the oscillator circuit 202. The RAMP signal 302 intersects the VC signal 304 level at time $T_1$ and, as discussed previously, causes the generation of the CLK2 clock signal 300 clock pulse at time $T_1$. The RAMP signal 302 continues increasing until it reaches the VPK signal 306 level at time $T_2$. In FIG. 4, VPK and $V_{REF}$ are again equal from time $T_1$ to time $T_5$. At time $T_5$, the reference voltage $V_{REF}$ 404 remains the same while the VPK signal 306 decreases. VPK 306 decreases because the RAMP signal 302 is reset at time $T_5$ prior to reaching the $V_{REF}$ value when the TIMER_RDY signal pulse 310 is generated. When the RAMP signal 302 reaches the VPK signal level at time $T_2$, the TIMER_DONE signal 308 generates a pulse at time $T_2$ and the RAMP signal 302 is pulled to ground. Responsive to the RAMP signal 302 being pulled to ground, the TIMER_RDY signal 310 generates a clock pulse at time $T_2$. Responsive to the TIMER_RDY signal 310 and the sync pulse 402, the CLK1 signal 312 generates another pulse at time $T_2$. The RAMP signal 302 will then begin to increase to time $T_3$ wherein this process repeats.

After time $T_4$, the pulse frequency of the SYNC signal 402 increases to a level higher than the default frequency of the oscillator within the oscillator circuit 202. The synchronization logic 206 will receive two SYNC pulses at time $T_5$ and time $T_6$ after the TIMER_RDY signal pulse 310 at time $T_5$ and $T_6$ but before receiving another TIMER_DONE signal pulse 308. Thus, the sync logic 206 will generate CLK1 pulses at times $T_5$ and $T_6$ responsive to the new sync pulses, and the oscillator 202 will reset the RAMP signal 302 to its starting level approximately at times $T_5$ and $T_6$ responsive to the new sync pulses. Since the RAMP signal 302 is reset to its starting level prior to reaching the $V_{REF}$ signal 404, the value of VPK at times $T_5$ and $T_6$ will decrease to the value representing the point at which the SYNC signal 402 causes the RAMP signal 302 to be reset. Since VPK 306 is reduced based upon a decreased maximum ramp value prior to resetting of the RAMP signal 302 the VC value 304 will also correspondingly decrease as the value of VC 304 is determined based upon the value of VPK 306 according to the equation (VPK×K/(1+K)). Therefore, the value of VPK 306 and VC 304 are reduced at times $T_5$ and $T_6$. CLK2 300 will still be approximately 0.9 of VPK 306 and substantially the same MAX_D value is provided from the maximum duty cycle detection circuit 164.

Figure 5:
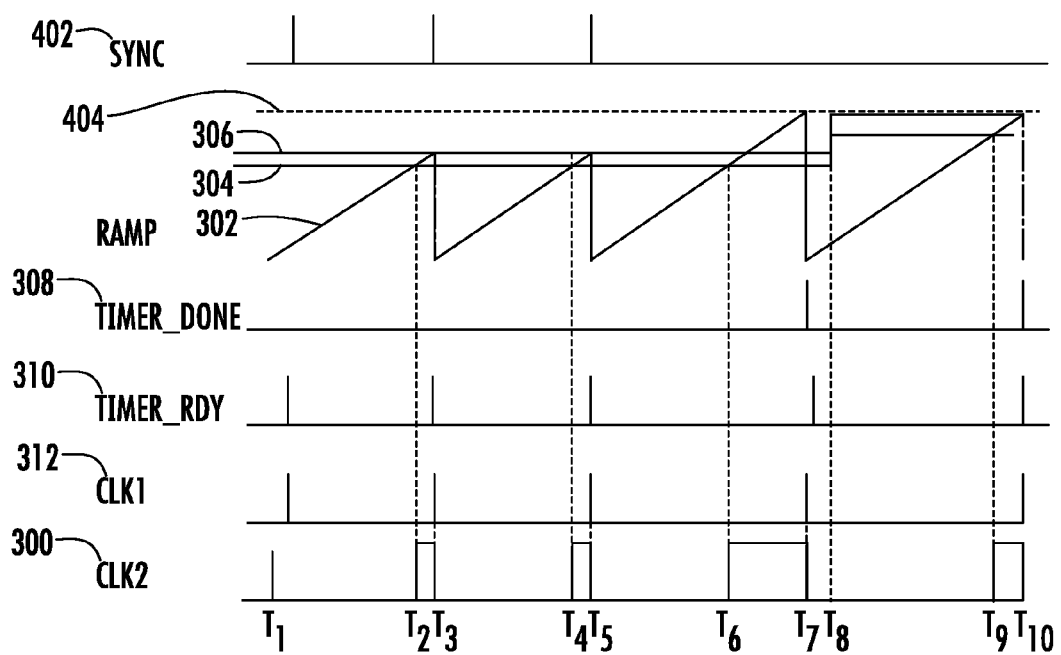
FIG. 5 is a timing diagram illustrating the inverse transition of FIG. 4 showing the transition from being synchronized to a higher sync frequency to a default frequency.

Referring now to FIG. 5, there is illustrated the inverse transition of FIG. 4 showing the transition from being synchronized to a higher sync frequency to the default frequency of the programmable clock phase shifter 200. The synchronization frequency have to be higher than the default frequency for the circuit (circuit of FIG. 2) to work properly. From time $T_1$ to time $T_2$, the phase shifter operates wherein the RAMP signal 302 increases until it intersects the VPK signal 306 at time $T_3$ and time $T_5$. When the VPK signal 306 is reached, the ramp 302 is reset to ground causing generation of the TIMER_RDY signal 310 pulse at time $T_3$ and time $T_5$ and the CLK1 pulse at times $T_3$ and $T_5$. The CLK2 pulses are generated at times $T_2$ and $T_4$ responsive to the RAMP signal 302 equaling the VC signal 304.

At time $T_5$, the synchronization pulses 402 begin to decrease in frequency. Thus, the synchronization logic 206 receives no sync pulses 402 after receiving TIMER_RDY signal pulses 310 and before receiving a TIMER_DONE pulse 308. Between time $T_5$ and the synchronization pulse at time $T_7$, the synchronization period increases and the RAMP signal 302 will continue to increase until it reaches the reference voltage 404 at time $T_7$. No early reset occurs when the ramp 302 intersects VPK 306 since no synchronization pulse is received. Upon reaching the reference voltage 404 at time $T_7$, the RAMP signal 302 is pulled low causing the generation of the TIMER_DONE pulse 308, TIMER_RDY pulse 310 and CLK1 pulse 312. Since the peak value of the RAMP signal 302 increases all the way to the reference value 404, the value of VPK 306 will increase to equal the reference voltage at time $T_8$. When VPK 306 increases the value of VC 304 will also increase at time $T_8$ as VC is based upon the value of VPK. Thus, at time $T_9$ the CLK2 pulse is generated when the ramp 302 intersects the VC signal level at time $T_9$, and the CLK1 pulse is generated when the RAMP signal 302 intersects $V_{REF}$ at time $T_{10}$. At time $T_8$, the values of VPK 306 and VC 304 change back to their default values. The CLK2 signal 300 will still remain 0.9 VPK and the MAX_D value will not change.

The described circuit and method provides a manner for setting the maximum duty cycle in a buck-boost converter. The described system provides a solution for a buck-boost converter to operate with a programmable maximum duty cycle. It avoids the use of complicated phase lock loop circuitry and has a fast response time to the external synchronization clock and maximum duty cycle is easily controlled using I$^2$C or trimming. Thus, the circuit provides major advantages of having the ability to adjust the maximum duty-cycle by trimming or via programming through an I$^2$C digital interface, fast response time, real-time phase shift, no waiting for settling, no complicated PLL circuit and reliance upon resistor matching to achieve phase shift accuracy.

It will be appreciated by those skilled in the art having the benefit of this disclosure for providing a programmable clock phase shifter for use with buck-boost converter. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An apparatus comprising:
   a buck boost converter for generating a regulated output voltage responsive to an input voltage and switching control signals;
   switching control circuitry for generating the switching control signals responsive to the regulated output voltage, a maximum duty cycle signal and a mode signal;
   mode control circuitry for generating the maximum duty cycle signal and the mode signal responsive to a buck PWM signal and a boost PWM signal, a first clock signal and a second clock signal phase shifted from the first clock signal by a fixed, programmable amount; and
   a phase shifter for generating the first clock signal and the second clock signal responsive to a reference voltage and a synchronization signal.

2. The apparatus of claim 1, wherein the phase shifter further comprises:
   an oscillator for generating a ramp voltage signal;
   first control circuitry for generating the first clock signal responsive to the ramp voltage signal; and
   second control circuitry for generating the second clock signal responsive to the ramp voltage signal and a peak ramp value of the ramp voltage signal, wherein the second control circuitry establishes the phase shift between the first clock signal and the second clock signal.

3. The apparatus of claim 2, wherein the oscillator generates a timer done control signal indicating the ramp voltage signal has reached the reference voltage and a timer ready control signal responsive to the ramp voltage signal being reset.

4. The apparatus of claim 3, wherein the first control circuitry further comprises synchronization control circuitry for generating the first clock signal responsive to the timer done control signal, the timer ready control signal and the synchronization signal.

5. The apparatus of claim 2, wherein the oscillator generates the peak ramp value responsive to a peak value of the ramp voltage signal.

6. The apparatus of claim 5, wherein the second control circuitry further comprises:
   a voltage divider circuit for generating a scaled value of the peak ramp value, wherein the voltage divider circuit is programmed to set the phase shift between the first clock signal and the second clock signal; and
   a comparator for comparing the ramp voltage signal with the scaled value of the peak ramp value and generating the second clock signal responsive thereto.

7. The apparatus of claim 6, wherein the voltage divider circuit further comprises:
   a first resistor; and
   a variable resistor connected in series with the first resistor, wherein a ratio of the variable resistor and first resistor establishes the phase shift between the first clock signal and the second clock signal.

8. The apparatus of claim 6, wherein the peak ramp value and the scaled value of the peaked ramp value change proportionally to each other responsive to the synchronization signal, the timer done control signal, the timer ready control signal and the ramp signal.

9. A phase shifter for use with a DC/DC voltage converter, comprising:
   an oscillator for generating a ramp voltage signal;
   first control circuitry for generating a first clock signal responsive to a ramp voltage signal; and
   second control circuitry for generating a second clock signal responsive to the ramp voltage signal and a peak ramp value of the ramp voltage signal, wherein the second control circuitry establishes a fixed phase shift between the first clock signal and the second clock signal.

10. The apparatus of claim 9, wherein the oscillator generates a timer done control signal indicating the ramp voltage signal has reached a reference voltage and a timer ready control signal responsive to the ramp voltage signal being reset.

11. The apparatus of claim 10, wherein the first control circuitry further comprises synchronization control circuitry for generating the first clock signal responsive to the timer done control signal, the timer ready control signal and the synchronization signal.

12. The apparatus of claim 9, wherein the oscillator generates the peak ramp value responsive to a peak value of the ramp voltage signal.

13. The apparatus of claim 12, wherein the second control logic further comprises:
   a voltage divider circuit for generating a scaled value of the peak ramp value, wherein the voltage divider circuit is programmed to set the fixed phase shift between the first clock signal and the second clock signal; and
   a comparator for comparing the ramp voltage signal with the scaled value of the peak ramp value and generating the second clock signal responsive thereto.

14. The apparatus of claim 6, wherein the voltage divider circuit further comprises:
   a first resistor; and
   a variable resistor connected in series with the first resistor, wherein a ratio of the variable resistor and first resistor establishes the fixed phase shift between the first clock signal and the second clock signal.

15. The apparatus of claim 6, wherein the peak ramp value and the scaled value of the peaked ramp value change proportionally to each other responsive to the synchronization signal, the timer done control signal, the timer ready control signal and the ramp signal.

16. A method for establishing a fixed phase shift between a first clock signal and a second clock signal for use with a DC/DC voltage converter, comprising the steps of:
   generating a regulated output voltage responsive to an input voltage and switching control signals;
   generating the switching control signals responsive to the regulated output voltage, a maximum duty cycle signal and a mode signal;
   generating the maximum duty cycle signal and the mode signal responsive to a buck PWM signal and a boost PWM signal and the first and second clock signals; and
   generating the first clock signal and the second clock signal phase shifted from the first clock signal by a fixed programmable amount responsive to a reference voltage and a synchronization signal.

17. The method of claim 16, wherein the step of generating the first clock signal and the second clock signal further comprises the steps of:

generating a ramp voltage signal;

generating the first clock signal responsive to the ramp voltage signal;

setting the phase shift between the first clock signal and the second clock signal; and generating the second clock signal responsive to the ramp voltage signal and a peak ramp value of the ramp voltage signal.

18. The method of claim 17, wherein the step of generating the first clock signal further includes the steps of:

generating a timer done control signal indicating the ramp voltage signal has reached the reference voltage;

generating a timer ready control signal responsive to the ramp voltage signal being reset;

generating the first clock signal responsive to the timer done control signal, the timer ready control signal and the synchronization signal.

19. The method of claim 17, wherein the step of generating the second clock signal further includes the steps of:

generating a peak ramp value responsive to a peak value of the ramp voltage signal;

generating a scaled value of the peak ramp value;

comparing the ramp voltage signal with the scaled value of the peak ramp value; and generating the second clock signal responsive to the comparison of the ramp voltage signal and the scaled value of the peak ramp value.

20. The method of claim 16, wherein the step of setting further comprises the step of establishing a value of a variable resistor within a resistor divider circuit.

21. A DC/DC converter generating a regulated output voltage from an input voltage comprising:

at least one controlled switch;

a clock circuit providing a nominal switching frequency for the DC/DC converter;

a control circuit responsive to the output voltage, the clock circuit and a reference voltage generating a control signal for the switch with a duty cycle that has a predetermined maximum value;

means to synchronize the clock circuit to an external frequency that is higher than the nominal switching frequency; and means to maintain the predetermined maximum value of the duty cycle independent of the external frequency synchronizing the clock.

\* \* \* \* \*

UNITED STATES PATENT AND TRADEMARK OFFICE
CERTIFICATE OF CORRECTION

| | |
|---|---|
| PATENT NO. | : 8,564,259 B2 |
| APPLICATION NO. | : 13/047424 |
| DATED | : October 22, 2013 |
| INVENTOR(S) | : Sicheng Chen et al. |

It is certified that error appears in the above-identified patent and that said Letters Patent is hereby corrected as shown below:

In The Claims

In Claim 8, Column 8, Lines 4 and 5 of the patent, the phrase "the timer done control signal, the timer ready control signal and the ramp signal." should read --a timer done control signal, a timer ready control signal and the ramp signal.--

In Claim 10, Column 8, Line 17 of the patent, the phrase "The apparatus of claim 9," should read --The phase shifter of claim 9,--

In Claim 11, Column 8, Line 22 of the patent, the phrase "The apparatus of claim 10," should read --The phase shifter of claim 10,--

In Claim 12, Column 8, Line 27 of the patent, the phrase "The apparatus of claim 9," should read --The phase shifter of claim 9,--

In Claim 13, Column 8, Line 30 of the patent, the phrase "The apparatus of claim 12," should read --The phase shifter of claim 12,--

In Claim 15, Column 8, Lines 49 and 50 of the patent, the phrase "the timer done control signal, the timer ready control signal and the ramp signal." should read --a timer done control signal, a timer ready control signal and the ramp signal.--

In Claim 20, Column 10, Line 6 of the patent, the phrase "The method of claim 16," should read --The method of claim 17,--

Signed and Sealed this
Twenty-second Day of September, 2015

Michelle K. Lee
*Director of the United States Patent and Trademark Office*